United States Patent
Asterjadhi et al.

(10) Patent No.: US 9,301,196 B2
(45) Date of Patent: Mar. 29, 2016

(54) APPARATUS AND METHODS FOR BLOCK ACKNOWLEDGMENT COMPRESSION

(71) Applicant: QUALCOMM Incorporated, San Diego, CA (US)

(72) Inventors: Alfred Asterjadhi, Breukelen (NL); Simone Merlin, San Diego, CA (US); Maarten Menzo Wentink, Breukelen (NL); Santosh Paul Abraham, San Diego, CA (US); Zhi Quan, Livermore, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 13/705,768

(22) Filed: Dec. 5, 2012

(65) Prior Publication Data

US 2013/0223213 A1 Aug. 29, 2013
US 2015/0029839 A9 Jan. 29, 2015

Related U.S. Application Data

(60) Provisional application No. 61/731,426, filed on Nov. 29, 2012, provisional application No. 61/691,066, filed on Aug. 20, 2012, provisional application No. 61/672,157, filed on Jul. 16, 2012, provisional application No. 61/648,510, filed on May 17, 2012, provisional application No. 61/642,604, filed on May 4, 2012, provisional application No. 61/605,900, filed on Mar. 2, 2012, provisional application No. 61/605,078, filed on Feb. 29, 2012.

(51) Int. Cl.
*H04W 28/06* (2009.01)
*H04W 4/00* (2009.01)
*H04L 1/00* (2006.01)
*H04L 1/16* (2006.01)

(52) U.S. Cl.
CPC ............ *H04W 28/065* (2013.01); *H04L 1/003* (2013.01); *H04L 1/009* (2013.01); *H04L 1/0025* (2013.01); *H04L 1/1614* (2013.01); *H04L 1/1671* (2013.01); *H04W 4/00* (2013.01); *H04W 28/06* (2013.01)

(58) Field of Classification Search
None
See application file for complete search history.

(56) References Cited

U.S. PATENT DOCUMENTS 6,052,812 A 4/2000 Chen et al.
6,768,721 B1 7/2004 Schmitz et al.

(Continued)

FOREIGN PATENT DOCUMENTS

CN 102333376 A 1/2012
EP 0286383 A2 10/1988

(Continued)

OTHER PUBLICATIONS

J. Son, IEEE P802.15 Wireless Personal Area Networks—Resolution for Acknowledgement Frame Related Comments, Jul. 9, 2010, pp. 1-3.*

(Continued)

*Primary Examiner* — Christopher Crutchfield
(74) *Attorney, Agent, or Firm* — Bernice Chen

(57) ABSTRACT

Systems, methods, and devices for compressing block acknowledgment (ACK) frames/packets are described herein. In some aspects, a method of communicating in a wireless network includes a compressed block acknowledgment frame including a bitmap, the bitmap indicating receipt of a plurality of fragments of a single data unit. The method further includes transmitting the compressed block acknowledgment frame.

48 Claims, 10 Drawing Sheets

(56) References Cited

U.S. PATENT DOCUMENTS

| | | | |
|---|---|---|---|
| 7,675,911 B2 | 3/2010 | Singh et al. |
| 7,680,148 B2 | 3/2010 | Nishibayashi et al. |
| 7,760,700 B2 | 7/2010 | Frederiks et al. |
| 7,869,418 B2 | 1/2011 | Nishibayashi et al. |
| 7,872,997 B2 | 1/2011 | Qian |
| 7,882,412 B2 | 2/2011 | Nanda |
| 7,903,632 B2 | 3/2011 | Nishibayashi et al. |
| 8,023,453 B2 | 9/2011 | Sammour et al. |
| 8,223,639 B2 | 7/2012 | Seok |
| 8,369,257 B2 | 2/2013 | Chu et al. |
| 8,675,633 B2 | 3/2014 | Nabetani et al. |
| 8,830,917 B1 | 9/2014 | Zhang et al. |
| 8,885,495 B1 | 11/2014 | Liu et al. |
| 9,088,908 B2 | 7/2015 | Liu |
| 9,131,398 B2 | 9/2015 | Liu et al. |
| 9,131,399 B2 | 9/2015 | Liu et al. |
| 2002/0172208 A1* | 11/2002 | Malkamaki | 370/400 |
| 2004/0254700 A1 | 12/2004 | Fehr et al. |
| 2005/0195750 A1* | 9/2005 | Le et al. | 370/252 |
| 2005/0195858 A1* | 9/2005 | Nishibayashi et al. | 370/474 |
| 2006/0007927 A1 | 1/2006 | Lee et al. |
| 2006/0018332 A1 | 1/2006 | Kakani et al. |
| 2006/0034174 A1* | 2/2006 | Nishibayashi et al. | 370/235 |
| 2006/0034274 A1 | 2/2006 | Kakani et al. |
| 2006/0034277 A1 | 2/2006 | Jang et al. |
| 2006/0034317 A1 | 2/2006 | Hong et al. |
| 2006/0048034 A1* | 3/2006 | Cho | 714/749 |
| 2006/0083233 A1 | 4/2006 | Nishibayashi et al. |
| 2006/0087998 A1* | 4/2006 | Saito et al. | 370/328 |
| 2006/0092871 A1 | 5/2006 | Nishibayashi et al. |
| 2006/0136614 A1 | 6/2006 | Kakani et al. |
| 2007/0002810 A1 | 1/2007 | Trainin et al. |
| 2007/0014237 A1 | 1/2007 | Nishibayashi et al. |
| 2007/0058566 A1 | 3/2007 | Frederiks et al. |
| 2007/0058623 A1 | 3/2007 | Moorti et al. |
| 2007/0110055 A1 | 5/2007 | Fischer et al. |
| 2007/0110324 A1 | 5/2007 | Kwon et al. |
| 2007/0113140 A1 | 5/2007 | Roh et al. |
| 2007/0127424 A1* | 6/2007 | Kwon et al. | 370/338 |
| 2007/0171858 A1 | 7/2007 | Grandhi et al. |
| 2007/0171933 A1 | 7/2007 | Sammour et al. |
| 2007/0258466 A1 | 11/2007 | Kakani |
| 2008/0037466 A1* | 2/2008 | Ngo et al. | 370/329 |
| 2008/0049707 A1 | 2/2008 | Kwon et al. |
| 2008/0056303 A1* | 3/2008 | Sebire et al. | 370/474 |
| 2008/0095168 A1 | 4/2008 | Frazier |
| 2008/0186890 A1 | 8/2008 | Shao et al. |
| 2009/0092039 A1 | 4/2009 | Niu et al. |
| 2010/0002646 A1 | 1/2010 | Nishibayashi et al. |
| 2010/0008381 A1 | 1/2010 | Jang et al. |
| 2010/0050041 A1 | 2/2010 | Chang et al. |
| 2010/0074277 A1 | 3/2010 | Nishibayashi et al. |
| 2010/0091654 A1 | 4/2010 | Ohno et al. |
| 2010/0146359 A1 | 6/2010 | Duan et al. |
| 2010/0182949 A1 | 7/2010 | Ji |
| 2010/0302981 A1 | 12/2010 | Tsai et al. |
| 2011/0026505 A1 | 2/2011 | Trainin |
| 2011/0063991 A1 | 3/2011 | Sampath et al. |
| 2011/0069688 A1 | 3/2011 | Zhang et al. |
| 2011/0096710 A1 | 4/2011 | Liu et al. |
| 2011/0103280 A1 | 5/2011 | Liu et al. |
| 2011/0107168 A1 | 5/2011 | Jung et al. |
| 2011/0246840 A1 | 10/2011 | Khoshnevis et al. |
| 2011/0280182 A1 | 11/2011 | Kim et al. |
| 2011/0317609 A1 | 12/2011 | Sammour et al. |
| 2011/0317630 A1 | 12/2011 | Zhu et al. |
| 2012/0084616 A1 | 4/2012 | Wentink |
| 2012/0201177 A1 | 8/2012 | Adachi et al. |
| 2012/0226955 A1 | 9/2012 | Norair |
| 2012/0230242 A1 | 9/2012 | Kim et al. |
| 2012/0236971 A1 | 9/2012 | Taghavi Nasrabadi et al. |
| 2012/0314653 A1 | 12/2012 | Liu |
| 2012/0314695 A1 | 12/2012 | Liu |
| 2012/0327870 A1 | 12/2012 | Grandhi et al. |
| 2013/0044877 A1 | 2/2013 | Liu et al. |
| 2013/0083781 A1 | 4/2013 | Zhang et al. |
| 2013/0142095 A1 | 6/2013 | Calcev et al. |
| 2013/0170345 A1* | 7/2013 | Merlin et al. | 370/230 |
| 2013/0223210 A1 | 8/2013 | Asterjadhi et al. |
| 2013/0223211 A1 | 8/2013 | Asterjadhi et al. |
| 2013/0223212 A1 | 8/2013 | Asterjadhi et al. |
| 2013/0223213 A1 | 8/2013 | Asterjadhi et al. |
| 2013/0223338 A1 | 8/2013 | Asterjadhi et al. |
| 2013/0223345 A1 | 8/2013 | Asterjadhi et al. |
| 2013/0227371 A1 | 8/2013 | Asterjadhi et al. |
| 2013/0301569 A1 | 11/2013 | Wang et al. |
| 2014/0185473 A1 | 7/2014 | Wong et al. |
| 2014/0301208 A1 | 10/2014 | Merlin et al. |
| 2014/0328237 A1 | 11/2014 | Sammour et al. |
| 2015/0029922 A1 | 1/2015 | Zheng et al. |
| 2015/0327120 A1 | 11/2015 | Liu |

FOREIGN PATENT DOCUMENTS

| | | |
|---|---|---|
| WO | 2004109440 A2 | 12/2004 |
| WO | 2006022484 A1 | 3/2006 |
| WO | WO-2006115371 A1 | 11/2006 |
| WO | 2007033313 A2 | 3/2007 |
| WO | 2009157901 A1 | 12/2009 |
| WO | WO-2010150124 A1 | 12/2010 |
| WO | WO-2013101679 | 7/2013 |
| WO | WO-2013184889 A1 | 12/2013 |
| WO | WO-2014011507 A1 | 1/2014 |
| WO | WO-2014042595 A1 | 3/2014 |
| WO | WO-2014042596 A1 | 3/2014 |

OTHER PUBLICATIONS

Y. Liu, R. Banerjeas, H. Zhang, S. Merlin, Z. Quan, S. Abraham, H. Sampath, V. Jones, M. Wentink, A. Asterjahadi, M. Fischer, M. Park, T. Tetzlaff, E. Qi, Short Ack, Doc No. IEEE 802.11-12/0324r2, Mar. 12, 2012, pp. 1-15.*

Gong F et al., "A new error control scheme for high speed networks", Tactical Communications Conference, vol. 1 .Digital Technology F or the Tactical Communicator., Proceedings of the 1994 Fort Wayne, IN, USA May 10-12, 1994, New York, NY, USA .IEEE, US, May 10, 1994, pp. 437-448, XP010149096, DOI: 10.1109/TCC.1994.472100 ISBN: 978-0-7803-2004-8.

International Search Report and Written Opinion—PCT/US2013/028376—ISA/EPO—Apr. 23, 2013.

Asterjadhi A., et al., "CC9-Resolution-CID 3; 11-13-1027-03-00ah-cc9-resolution-cid-3," IEEE Draft; 11-13-1027-03-00AH-CC9-Resolution-CID-3, IEEE-SA Mentor, Piscataway, NJ, USA, vol. 802.11ah, No. 3, Sep. 16, 2013, pp. 1-9, XP068062909, [retrieved on Sep. 16, 2013], pp. 5-8.

Asterjadhi A., et al., "CC9-Resolution-CIDs for Speed Frame Exchange; 11-13-1062-02-00ah-cc9-resolution-cids-for-speed-frame-exchange," IEEE Draft; 11-13-1062-02-00AH-CC9-Resolution-CIDS-For-Speed-Frame-Exchange, IEEE-SA Mentor, Piscataway, NJ, USA, vol. 802.11ah, No. 2, Sep. 15, 2013, pp. 1-8, XP068062956, [retrieved on Sep. 15, 2013], the whole document.

Park M., et al., "AP Assisted Medium Synchronization ; 11-12-0840-01-00ah-ap-assisted-medium-synchronization", IEEE SA Mentor; 11-12-0840-01-00AH-AP-Assisted-Medium-Synchronization, IEEE-SA Mentor, Piscataway, NJ USA, vol. 802.11ah, No. 1, Sep. 17, 2012, pp. 1-16, XP068039371.

Park M., "IEEE P802.11, Wireless LANS, Proposed Specification Framework for Tgah", TGah Spec Framework, doc.: IEEE 802.11-11/1137r11, (Sep. 2012), pp. 1-36.

Park M., "IEEE P802.11, Wireless LANS, Proposed Specification Framework for Tgah", TGah Spec Framework, doc.: IEEE 802.11-11/1137r6, (Mar. 2012), pp. 1-13.

Park M., IEEE P802.11, Wireless LANS, Specification framework for TGah, TGah Spec Framework, doc.: IEEE 802.11-11/1137r14, Mar. 2013, pp. 1-67.

Park M., "Specification framework for TGah; 11-11-1137-14-00ah-specification-framework-for-tgah," IEEE SA Mentor, 11-11-1137-14-00AH-Specification-Framework-For-Tgah, IEEE-SA Mentor, Piscataway, NJ, USA, vol. 802.11ah, No. 14, Mar. 20, 2013, pp. 1-66,

(56) References Cited

OTHER PUBLICATIONS

XP068053521, [retrieved on Mar. 20, 2013], chapters 3.2, 3.2.1, 3.2.1.1, 4.2.5,, 4.4.2.1, 4.4.2.3, 4.4.2.6.

Park M., "Specification framework for TGah; 11-11-1137-15-00ah-specification-framework-for-tgah," IEEE SA Mentor, 11-11-1137-15-00AH-Specification-Framework-For-Tgah, IEEE-SA Mentor, Piscataway, NJ, USA, vol. 802.11ah, No. 15, May 16, 2013, pp. 1-76, XP068053522, [retrieved on May 16, 2013], p. 38, chapters 4.4.2.1 and 4.4.2.6.

Seok Y., et al., "TXOP Truncation ; 11-12-1302-00-00ah-txop-truncation", IEEE SA Mentor; 11-12-1302-00-00AH-TXOP-Truncation, IEEE-SA Mentor, Piscataway, NJ USA, vol. 802.11ah, Nov. 12, 2012, pp. 1-14, XP068040140.

Zheng S. et al., "TGah D1.0 Comment Resolutions for NDP Modified ACK" IEEE Draft; 11-13-1426-01-00AH-Resolution-For-Draft-1-0-Comments-In-Clause-8-3-5-1-4, IEEE-SA Mentor, Piscataway, NJ, USA, vol. 802.11ah, No. 1, Nov. 13, 2013, doc.: IEEE 802.11-13/142R1; pp. 1-4, XP068063455, [retrieved on Nov. 13, 2013].

\* cited by examiner

APPARATUS AND METHODS FOR BLOCK ACKNOWLEDGMENT COMPRESSION

The present application claims priority to provisional U.S. Application Ser. No. 61/605,078, entitled "APPARATUS AND METHODS FOR BLOCK ACKNOWLEDGMENT COMPRESSION," filed Feb. 29, 2012, assigned to the assignee hereof and incorporated herein by reference in its entirety. The present application further claims priority to provisional U.S. Application Ser. No. 61/642,604, entitled "APPARATUS AND METHODS FOR BLOCK ACKNOWLEDGMENT COMPRESSION," filed May 4, 2012, assigned to the assignee hereof and incorporated herein by reference in its entirety. The present application further claims priority to provisional U.S. application Ser. No. 61/672,157, entitled "APPARATUS AND METHODS FOR BLOCK ACKNOWLEDGMENT COMPRESSION," filed Jul. 16, 2012, assigned to the assignee hereof and incorporated herein by reference in its entirety. The present application further claims priority to provisional U.S. Application Ser. No. 61/605,900, entitled "SYSTEMS AND METHODS FOR GENERATING AND DECODING SHORT CONTROL FRAMES IN WIRELESS COMMUNICATIONS, "filed Mar. 2, 2012, assigned to the assignee hereof and incorporated herein by reference in its entirety. The present application further claims priority to provisional U.S. Application Ser. No. 61/648,510, entitled "SYSTEMS AND METHODS FOR GENERATING AND DECODONG SHORT CONTROL FRAMES IN WIRELESS COMMUNICATIONS," filed May 17, 2012, assigned to the assignee hereof and incorporated herein reference in its entirety. The present application further claims priority to provisional U.S. Application Ser. No. 61/691,066, entitled "SYSTEMS AND METHODS FOR GENERATING AND DECODING SHORT CONTROL FRAMES IN WIRELESS COMMUNICATIONS,"filed Aug. 20, 2012, assigned to the assignee hereof and incorporated herein by reference in its entirety. The present application further claims priority to provisional U.S. Application Ser. No. 61/731,426, entitled "SYSTEMS AND METHODS FOR GENERATING AND DECODING SHORT CONTROL FRAMES IN WIRELESS COMMUNICATIONS," filed Nov. 29, 2012, assigned to the assignee hereof and incorporated herein by reference in its entirety.

BACKGROUND

1. Field

The present application relates generally to wireless communications, and more specifically to systems, methods, and devices for compressing block acknowledgements (BAs) for communication.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units or data frames. Devices that receive packets may further transmit acknowledgment packets (ACKs) to the transmitters of the received packets to indicate successful receipt of the packets. These acknowledgement packets may also take the form of block ACKs. These block ACKs may utilize a significant amount of bandwidth for transmission. Thus, improved systems, methods, and devices for communicating block ACKs are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the size/compressing of block ACKs, thereby reducing the bandwidth used to transmit such data packets.

One aspect of the disclosure provides a method of communicating in a wireless network. The method comprises generating a compressed block acknowledgment frame comprising a bitmap, the bitmap indicating receipt of a plurality of fragments of a single data unit. The method further comprises transmitting the compressed block acknowledgment frame.

Another aspect of the disclosure provides a wireless device, comprising: a processor configured to generate a compressed block acknowledgment frame comprising a bitmap, the bitmap indicating receipt of a plurality of fragments of a single data unit. The wireless device further comprises a transmitter configured to transmit the compressed block acknowledgment frame.

Another aspect of the disclosure provides a wireless device, comprising: means for generating a compressed block acknowledgment frame comprising a bitmap, the bitmap indicating receipt of a plurality of fragments of a single data unit. The wireless device further comprises means for transmitting the compressed block acknowledgment frame.

Another aspect of the disclosure provides non-transitory computer-readable medium comprising code that, when executed, causes an apparatus to: generate a compressed block acknowledgment frame comprising a bitmap, the bitmap indicating receipt of a plurality of fragments of a single data unit. The non-transitory computer-readable medium further comprises code that, when executed, causes the apparatus to transmit the compressed block acknowledgment frame.

DETAILED DESCRIPTION

Figure 1:
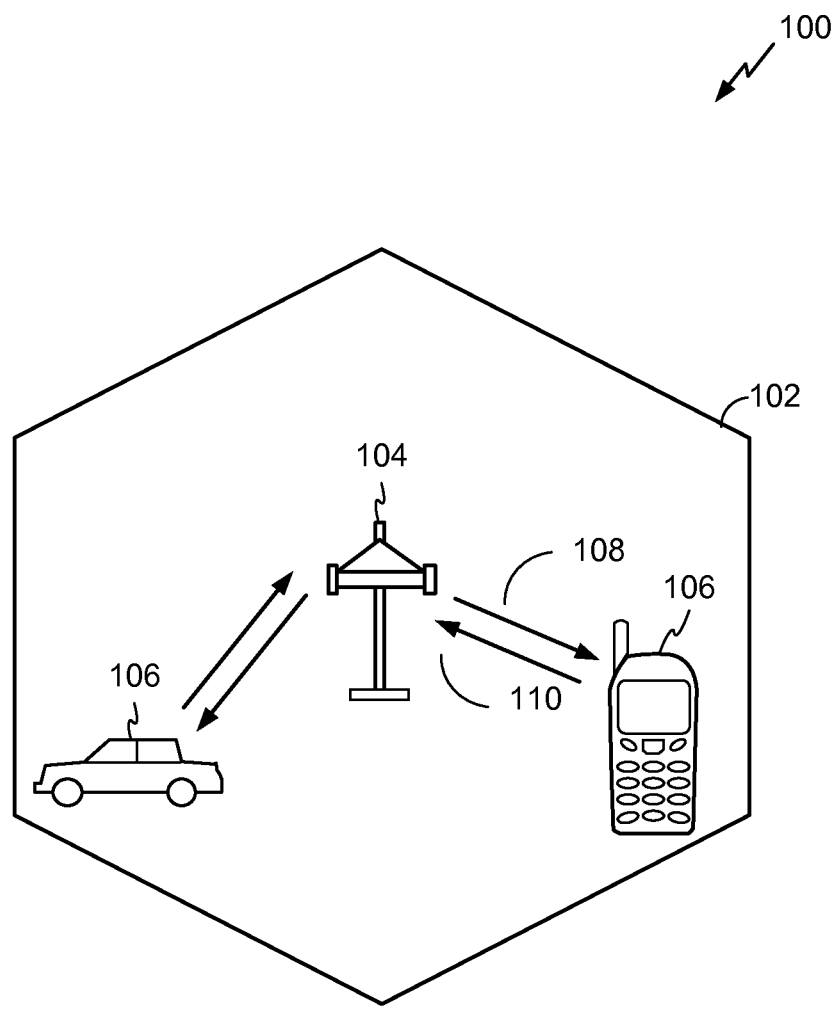
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some aspects, devices used as sensors may have a low duty cycle and limited capabilities. For example, such devices may be configured to wake up and transmit and/or receive limited bursts of medium access control (MAC) protocol data units (MPDUs). After such bursts, the device may enter a sleep state for an extended period of time. Further, such devices may only be able to transmit with low transmission rates, thus sometimes requiring fragmentation to transmit large packets. The devices may further have limited buffer capacities.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Devices, such as STAs and/or APs, in a wireless network transmit and/or receive information between each other. The information exchanged between the devices may comprise packets, which in some aspects may be referred to as data units or data frames. Devices that receive packets may further transmit acknowledgment packets (ACKs) to the transmitters of the received packets to indicate successful receipt of the packets. For example, a STA that receives packets from an AP may transmit an ACK to the AP to acknowledge successful receipt of the packets. These acknowledgement packets may also take the form of block ACKs. In some aspects, a block ACK may be used by a device to acknowledge a group of packets or frames. For example, a block ACK may allow a device to receive several packets or frames before transmitting a single block ACK to acknowledge receipt of the several packets or frames. These block ACKs may use a significant amount of bandwidth for transmission. In some aspects, the block ACKs may be compressed using various systems, methods, and devices, which may result in reduced bandwidth consumption by the block ACKs.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. Further, in some aspects, STAs 106 may communicate directly with each other and form a direct link (direct) between each other.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. In another example, the functions of the AP 104 described herein may alternatively be performed by one or more of the STAs 106.

Figure 2:
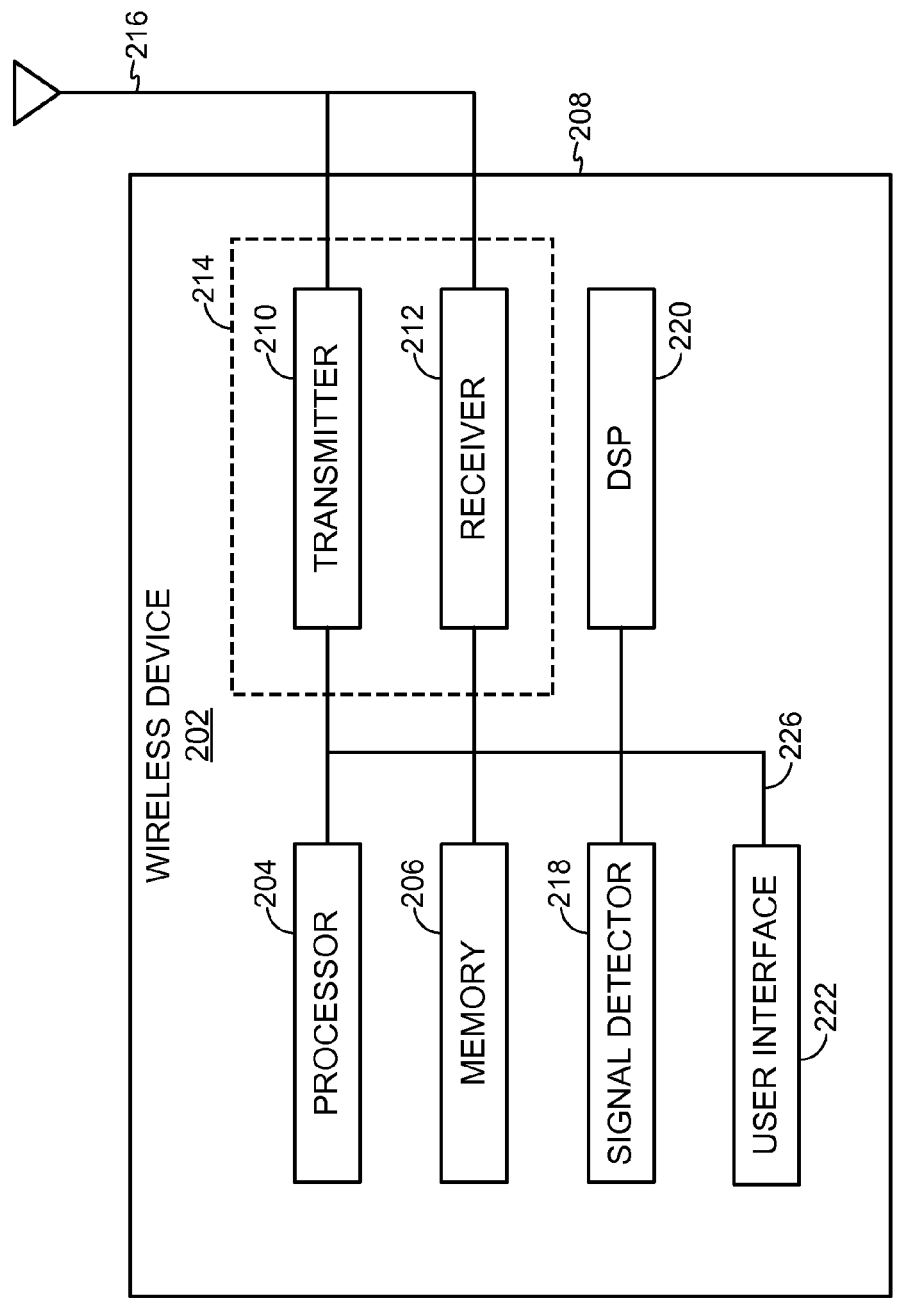
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a receiving node, the processor 204 may be configured to generate packets including compressed block ACKs of one or more of the formats described herein. For example, the processor 204 may be configured to generate a block ACK of one or more of the formats described herein based on receipt of other packets, as discussed in further detail below.

When the wireless device 202 is implemented or used as a transmitting node, the processor 204 may be configured to process block ACKs of one or more of the formats described herein. For example, the processor 204 may be configured to receive, in response to other packets that were transmitted, and process a block ACK as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets including block ACKs of one or more of the formats described herein. The receiver 212 may be configured to wirelessly receive packets including block ACKs of one or more of the formats described herein.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive communications including block ACKs.

A block ACK allows a device that receives multiple data packets to acknowledge their reception with a single Block Ack frame instead of using multiple ACK frames. For example, the block ACK may include a bitmap with multiple bits, the value of each bit indicating whether or not a particular data packet in a sequence of data packets was received. A block ACK may be a frame of data. Uncompressed block ACKs require the entire bitmap be sent regardless of which packets are received successfully or not, which can create overhead and use precious bandwidth. Accordingly, systems and methods are described herein for compressing/reducing the size of block ACKs. In some aspects, certain fields of a frame in which the block ACK are sent may be removed or modified. Additionally or alternatively to such aspects, in some aspects, the bitmap may be compressed or reduced in size according to techniques described herein.

Figure 3:
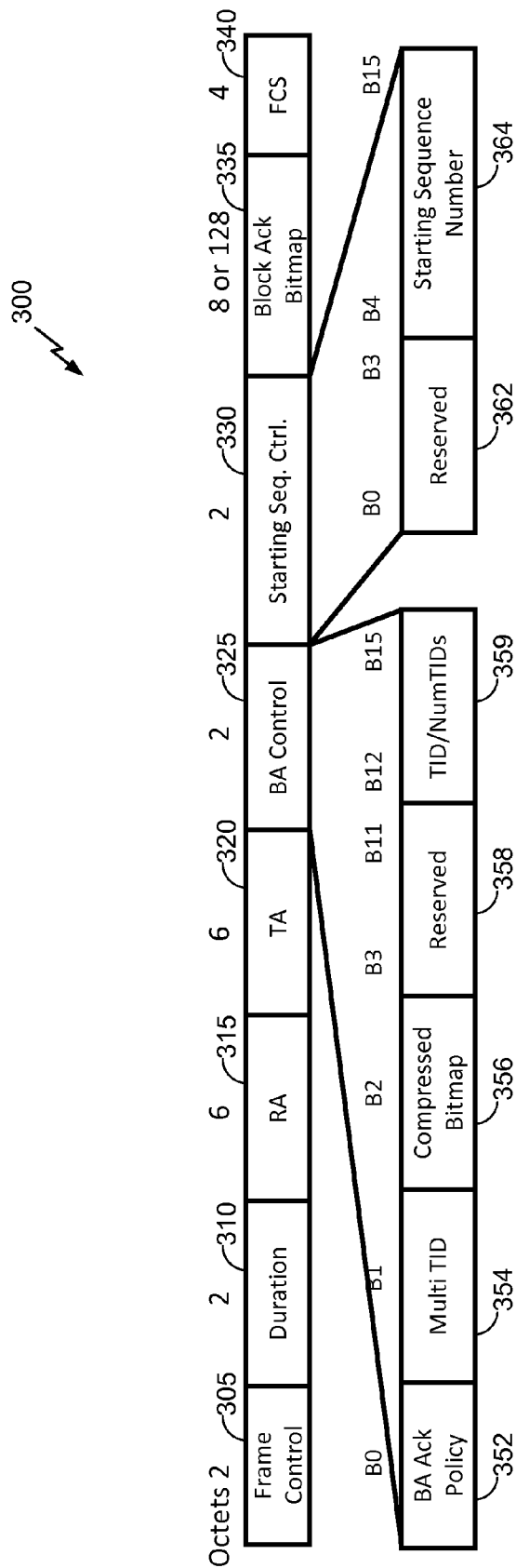
FIG. 3 illustrates an example of a basic block ACK frame.

FIG. 3 illustrates an example of a basic block ACK frame 300. As shown, the basic block ACK frame includes a frame control field 305 comprising 2 octets, a duration field 310 comprising 2 octets, a receiver address field 315 comprising 6 octets, a transmitter address field 320 comprising 6 octets, a block ACK control field 325 comprising 2 octets, a starting sequence control field 330 comprising 2 octets, a block ACK bitmap 335 comprising 8 or 128 octets, and a frame check sequence field 340 comprising 4 octets. Further, the block ACK control field 325 comprises a block ACK policy subfield 352, a multi traffic identifier (TID) subfield 354, a compressed bitmap subfield 356, a reserved subfield 358, and a TID/NumTIDs subfield 359. The starting sequence control field 330 comprises a reserved subfield 362 and a starting sequence number subfield 364. Accordingly, the block ACK frame 300 can be 32 bytes or 152 bytes long.

Figure 4:
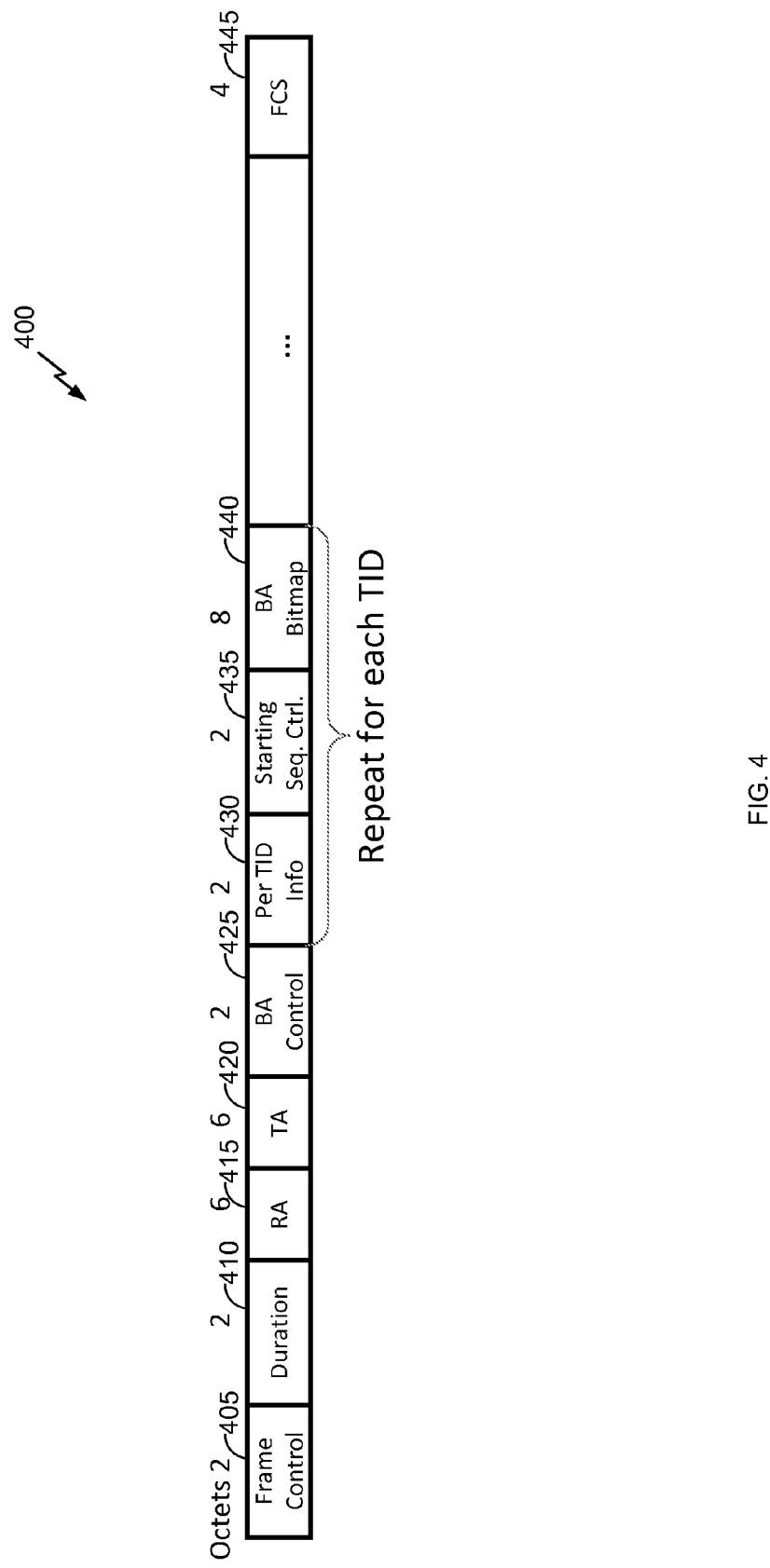
FIG. 4 illustrates an example of a multi-TID block ACK frame.

FIG. 4 illustrates an example of a multi-TID block ACK frame 400. As shown the frame 400 includes a frame control field 405 comprising 2 octets, a duration field 410 comprising 2 octets, a receiver address field 415 comprising 6 octets, a transmitter address field 420 comprising 6 octets, a block ACK control field 425 comprising 2 octets, a per TID info field 430 comprising 2 octets, a starting sequence control field 435 comprising 2 octets, a block ACK bitmap 440 comprising 8 octets, and a frame check sequence field 445 comprising 4 octets. The per TID info field 430, starting sequence control field 435, and block ACK bitmap 440 are repeated in the frame for each TID for which the block ACK frame 400 is used to acknowledge packets. Further, the block ACK control field 425 comprises a block ACK policy subfield, a multi traffic identifier (TID) subfield, a compressed bitmap subfield, a reserved subfield, and a TID/NumTIDs subfield similar to block ACK frame 300. The starting sequence control field 435 comprises a reserved subfield and a starting sequence number subfield similar to block ACK frame 300. The per TID info field 430 comprises a reserved subfield and a TID subfield.

Figure 5:
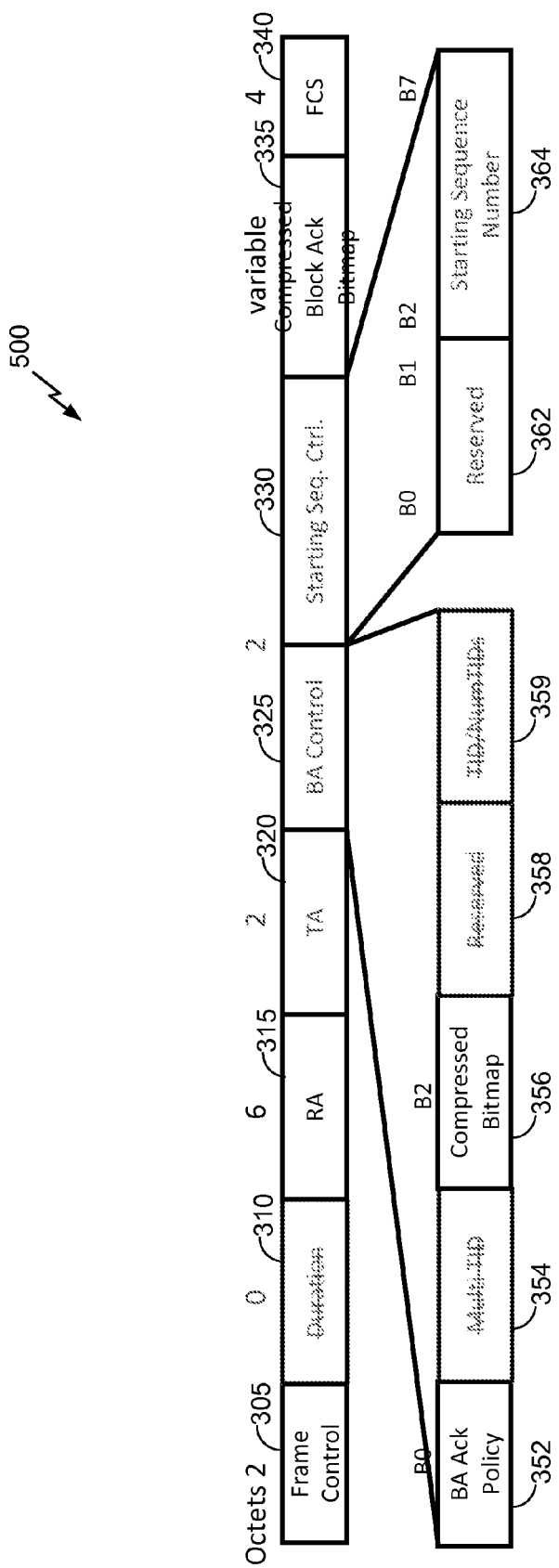
FIG. 5 illustrates an example of a compressed basic block ACK frame.

FIG. 5 illustrates an example of a compressed basic block ACK frame 500. In particular, compressed basic block ACK frame 500 is illustrated as the basic block ACK frame 300 with strikeout over the fields that may not be included in the compressed basic block ACK frame 500. For example one or more of the following fields of the basic block ACK frame 300 may be excluded from the compressed basic block ACK frame 500, thereby reducing the size of the compressed basic block ACK frame 500 as compared to the basic block ACK frame 300: the duration field 310, the multi TID subfield 354, the reserved subfield 358, and the TID/NumTIDs subfield 359. In addition or alternatively, the block ACK bitmap field 335 may include a compressed bitmap, such as through compression of one of the techniques described herein, and therefore the length of the block ACK bitmap field 335 may be variable and/or based on the technique used. In addition or alternatively, the receiver address field 315 and/or the transmitter address field 320 may be reduced from 6 octets in length to 2 octets in length by using a local address (e.g., access identifier (AID)) instead of a global address (e.g., medium access control (MAC) address). In addition or alternatively, the reserved subfield 362 can be reduced to 2 bits. A value of 00 of the reserved subfield 362, in such an aspect, may indicate that the length of the block ACK bitmap field 335 is 0 and other values may indicate the method of compression used for the bitmap stored in the block ACK bitmap field 335. In addition or alternatively, the starting sequence number subfield 364 may be reduced by only including the Least Significant Bits of the Starting Sequence Number. The length of the reduced starting sequence number may depend on the size of the block ACK bitmap field 335. As an example a Sequence Number of 6 bits in length is sufficient to distinguish among multiples of blocks of 64 MPDUs.

Figure 6:
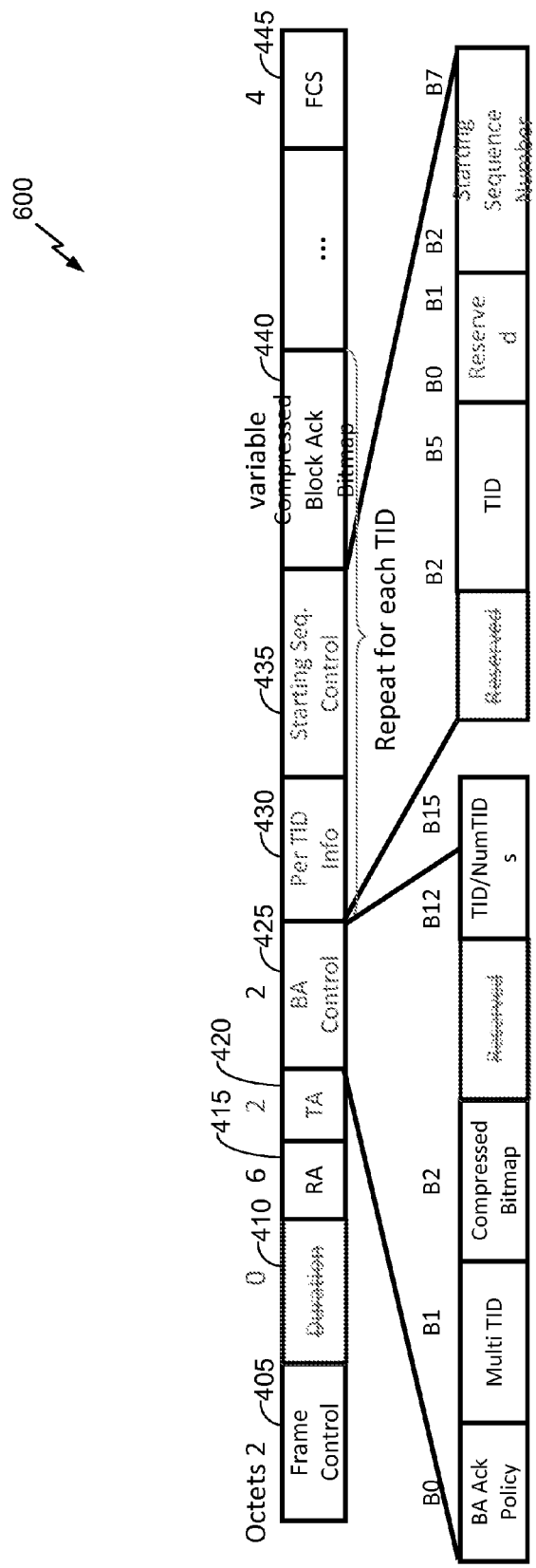
FIG. 6 illustrates an example of a compressed block ACK frame compatible with basic ACK and multi TID.

FIG. 6 illustrates an example of a compressed block ACK frame 600 compatible with basic ACK and multi TID. In particular, compressed block ACK frame 600 is illustrated as the multi-TID block ACK frame 400 with strikeout over the fields that may not be included in the compressed block ACK frame 600. For example one or more of the following fields of the multi-TID block ACK frame 400 may be excluded from the compressed block ACK frame 600, thereby reducing the size of the compressed block ACK frame 600 as compared to the multi-TID block ACK frame 400: the duration field 410, the reserved subfield of the block ACK control field 425, and the reserved subfield of the per TID info field 430. In addition or alternatively, the block ACK bitmap field 440 may include a compressed bitmap, such as through compression of one of the techniques described herein, and therefore the length of the block ACK bitmap field 440 may be variable and/or based on the technique used. In addition or alternatively, the receiver address field 415 and/or the transmitter address field 420 may be reduced from 6 octets in length to 2 octets in length by using a local address (e.g., access identifier (AID)) instead of a global address (e.g., medium access control (MAC) address). In addition or alternatively, the reserved subfield of the starting sequence control field 435 can be reduced to 2 bits. A value of 00 of the reserved subfield, in such an aspect, may indicate that the length of the block ACK bitmap field 440 of the corresponding TID is 0 and other values may indicate the method of compression used for the bitmap stored in the block ACK bitmap field 440 of the corresponding TID. In addition or alternatively, the starting sequence control subfield 435 may be reduced by only including the Least Significant Bits of the Starting Sequence Number. The length of the reduced starting sequence number depends on the size of the block ACK bitmap field 440. As an example a Sequence Number of 6 bits in length is sufficient to distinguish among multiples of blocks of 64 MPDUs.

In some aspects, a block ACK frame, such as the frames 300 and 400, may be compressed by moving certain fields from the MAC header of the frames 300 and 400 to a physical layer (PHY) header. For example, the duration field 310 and/or the frame control field 305 of the frame 300 may be removed from the MAC header and 6 bits may be added as a block packet identifier (PID) to the PHY header. For example, the 6 bits may comprise the 6 least significant bits of the starting sequence number subfield 364 where the size of the starting sequence number depends on the block ACK size (64 bits in one example). The use of 6-bits may be beneficial as it reduces the likelihood of false positives with other concurrent block ACK frames and/or OBSS transmissions. Similarly, the duration field 410 and/or the frame control field 405 of the frame 400 may be removed. Additionally or alternatively, the block ACK control field 325 of the frame 300 may be removed from the MAC header and a single bit block ACK policy subfield, single bit compressed bitmap subfield, and 2-bit compression control subfield added to the PHY header. A value of 00 of the compression control subfield, in such an aspect, may indicate that the length of the block ACK bitmap field 335 is 0 and other values may indicate the method of compression used for the bitmap stored in the block ACK bitmap field 335. Similarly, the block ACK control field 425 of the frame 400 may be added to the PHY header.

Figure 11:
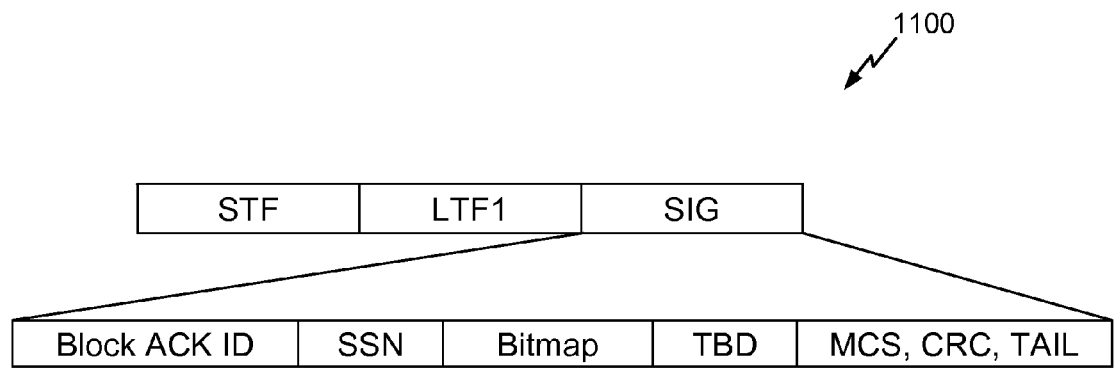
FIG. 11 illustrates an example of a PHY header including information related to a block ACK frame.

In some aspects, certain bits in a signal (SIG) field of a PHY header may be used to store information related to a block ACK frame. For example, FIG. 11 illustrates an example of a PHY header 1100 including information related to a block ACK frame. The modulation coding scheme (MCS), cyclic redundancy check (CRC) and tail fields of the PHY header 1100 may be made up of the same bits as a standard PHY header. In some aspects, a reserved value for the MCS field (e.g., any of the values from 10 to 15) may be used to indicate that the PHY header includes information related to a block ACK frame. In some aspects, 22 bits of the SIG field of the PHY header 1100 having a 1 MHz PHY header format may be used to store information related to a block ACK frame. In some aspects, 34 bits of the SIG field of the PHY header 1100 having a 2 MHz PHY header format may be used to store information related to a block ACK frame. The information that may be stored using the bits of the SIG field may comprise one or more of the following: a block ACK ID, a starting sequence number (which may be included in a starting sequence control field), a block ack bitmap, and/or other suitable fields. These fields may be used by the receiver to communicate additional information to the transmitter (e.g., More Data, Doppler indication, response frame bits, etc). In some aspects, the block ACK ID may be a sequence number derived from the first MPDU of the block for which the block ACK is being sent, or from a block ACK request (BAR) frame. For example, in an embodiment, the block ACK ID may be derived from a scrambler seed field of the first MPDU. In an embodiment, the block ACK ID field may be derived from the scrambler seed of the A-MPDU for which the block ACK is being sent. In some aspects, the starting sequence number included in the PHY header 1100 may be based on the least significant bits (LSBs) of a starting sequence number. In an embodiment, the starting sequence number is based on the BAR frame. In an embodiment, the sequence number may be based on the first MPDU of the block or the A-MPDU. For example, 6 LSBs can be used to identify the starting sequence number in a window of 64 MPDUs.

In certain embodiments the starting sequence number can be used as an identifier of the frame. In some embodiments, the starting sequence number may be the only identifier of the short Block Ack (i.e., there may not be a block Ack ID). In some embodiments, the starting sequence number and the block Ack ID may jointly identify the frame. In some aspects, a block bitmap may comprise 8 bits for a 1 MHz PHY preamble. In some aspects, a block bitmap may comprise 16 bits for a 2 MHz PHY preamble. In some aspects, the size of the block bitmap may depend on bit availability in the SIG field. In an embodiment, the block bitmap may be less than eight (8) bits. In an embodiment, the block bitmap may be greater than 8 bits.

As discussed above, fragmentation of a data packet may be used for transmission of data. For example, fragmentation may be used to avoid retransmission of large frames. For example, multiple fragmented frames may be transmitted during the same transmit opportunity (TXOP). Further, fragmentation may be used to transmit large frames in a TXOP for low PHY rates (e.g., one fragment may be sent in a TXOP). In some aspects, such fragments may be acknowledged using an uncompressed block ACK or multiple ACKs, which may introduce overhead.

In some aspects, a compressed (also referred to as "short") block ACK (e.g., compressed by any of the methods described herein) may be used to acknowledge fragments. For example, in some aspects, one compressed block ACK may be used to acknowledge up to 16 fragments for a 2 MHz communication. In some aspects, one compressed block ACK may be used to acknowledge up to 8 fragments for a 1 MHz communication.

In some aspects, in order to distinguish between a compressed block ACK that is acknowledging fragments and a compressed block ACK that is acknowledging multiple data packets, an ACK mode field may be included in the block ACK. The ACK mode field may have a first value indicating a block ACK mode (e.g., indicating the block ACK is acknowledging multiple data packets) or a second value indicating a fragment mode (e.g., indicating the block ACK is acknowledging fragments). In some aspects, if the compressed block ACK is acknowledging fragments, the starting sequence number of the compressed block ACK may be the sequence number of the MAC service data unit (MSDU) being fragmented. In some aspects, the starting sequence number may be the least significant bits (LSBs) of the sequence number of the MSDU being fragmented while the block ACK ID may be the most significant bits (MSBs) of the starting sequence number. In another aspect the block ACK ID may be derived from the scrambler seed of the first fragment of the MSDU being fragmented. Further, in some such aspects, the block bitmap may be used to map to fragments instead of different packets. In another aspect, the originator of a packet and responder may agree to set a buffersize to 1 frame during add block ACK (ADDBA) request and/or response exchange. In this case the discrimination between a block ACK mode and a fragment mode may be performed based on a buffersize. As an example, if the buffersize is agreed to be set to 1 then the following block ACK will be interpreted as a fragment ACK. Instead if the buffersize is greater than 1 the block ACK is interpreted as referring to multiple packets.

In another embodiment, an acknowledgement may be identified as a block ack or a fragment ack based on information found in a data frame being acknowledged. If the data frame being acknowledged indicates a block ACK is required and the fragment number associated with the data frame is greater than 0, then the response acknowledgement may be interpreted as a fragment ack. If the fragment number of the data frame is zero (0) a response frame may be interpreted as a block ACK.

In an embodiment, a short ACK frame may be similarly distinguished. In this embodiment, control response frames that acknowledge frames, including short Ack, short Block Ack and short Fragment Ack, may be identified based on a reserved MCS value. The control response short ACK, short Block ACK, and short Fragment ACK may be distinguished based on a data frame being acknowledged. If the data frame indicates it requires an acknowledgment, the control response may be interpreted as an acknowledgement to the single data frame. If the data frame indicates a block acknowledgment is required, the control response frame may be interpreted as an acknowledgment for multiple frames.

Various techniques for compression of a block ACK bitmap, such as of the block ACK bitmap field 335 or block ACK bitmap field 440, in any suitable type of block ACK frame, such as any of those described herein, are described herein.

In one aspect, a block ACK bitmap is compressed by only sending information about which packets are not correctly received. For example, a bitmap may be 8 bytes in size (e.g., in sequence bytes 0-7) and have a bit corresponding to each packet for which feedback is required. A value of 1 for a bit may indicate the corresponding packet is not correctly received. A value of 0 for a bit may indicate the corresponding packet is correctly received. Instead of sending all of the '0' and '1' values for each bit of the bitmap in the block ACK bitmap field, an offset may be included to indicate where the first '1' or '0' value occurs, and then the bitmap from the first '1' or '0' to the last '1' or '0' value that occurs may also be included. For example, the bitmap may comprise 8 bytes with the value (00000000 10001010 01011100 00000000 00000000 00000000 00000000 00000000). Accordingly, where the first and last '1' values are indicated, the first bit with a value of '1' is not encountered until the 1 byte. Further, the last bit with a value of '1' is encountered in the 2 byte.

Accordingly, in order to compress the bitmap, an offset value is selected corresponding to the byte number where the first value of '1' occurs, which is the 1 byte (001 in binary). The number of bits used for the offset depends on the number of bytes that the bitmap corresponds to. For example, an 8 byte bitmap would require at least 8 unique numbers to index each byte, thus 3 bits are used to represent the offset. Then, a bitmap of the bytes that include a value of 1 are included in the block ACK bitmap field, which includes bytes 1 and 2. A receiver of the block ACK bitmap field can accordingly utilize the offset to determine that any bytes prior to the byte indicated by the offset and any bytes after the offset plus any additional bytes included in the block ACK bitmap include all 0's or 1's. The remaining bytes have the values indicated in the bitmap. Thus, in the above example, the 8 byte bitmap is compressed to 18 bits. An additional bit may be included in the PHY header to indicate whether the compression is performed according to the 1's positions or the 0's positions.

In another aspect, the length of the block ACK bitmap may be reduced in length, such as 1, 2, 3, or 4 bytes, meaning fewer packets may be acknowledged by each block ACK frame.

In another aspect, block ACK bitmaps may be compressed using run-length encoding (RLE) methods. For example, the block ACK bitmap field may include a first bit subfield of 1-bit that indicates whether the first bit is a '1' or a '0.' Then the block ACK bitmap field may include one or more sequence length subfields each of length N-bits (e.g., 10 or 6 bits). The first of the sequence length subfields indicates the number of bits in sequence starting at the first bit that are the same as the first bit. The next sequence length subfield indicates the number of bits in sequence starting at the number of bits after the previous sequence length subfield that are of the opposite value as the bits of the previous sequence length subfield. For example, the sequence 1111110000000000110, may be encoded with a '1' in the first bit subfield, as the first bit is a '1.' The first sequence length subfield may have a value of 6, as there are 6 '1' bits. The second sequence length subfield may have a value of 11, as there are 11 '0' bits that have the opposite value as the previous '1' bits. The third sequence length subfield may have a value of 2, as there are 2 '1' bits that have the opposite value as the previous '0' bits. The fourth sequence length subfield may have a value of 1, as there is 1 '0' bit that have the opposite value as the previous '1' bits. A receiver of the block ACK bitmap field can then recreate the bitmap using these values.

In another aspect, the block ACK bitmap field can include one or more sub-bitmap elements. Each element may comprise an offset subfield (e.g., 10 bits), a reserved subfield (e.g., 1 bit), a length subfield (e.g., 3 bits), and a bitmap subfield (e.g., 0-7 bytes). Multiple of these sub-bitmap elements may be included in the block ACK bitmap field to indicate the values of the block ACK bitmap as follows. Each sub-bitmap element may indicate the values for a subset or portion of the block ACK bitmap. The offset subfield may indicate the offset in bits from the start of the block ACK bitmap that the sub-bitmap element includes values for. The reserved subfield may be used to indicate whether the bitmap in the bitmap subfield of the sub-bitmap element is inverted or not. The length subfield may indicate the length in bytes of the bitmap in the bitmap subfield of the sub-bitmap element. A length of 0 may indicate that the sub-bitmap element does not include a bitmap subfield, and therefore instead indicates the value of the bitmap at the position of the value of the offset subfield. The bitmap subfield may include the values of the bitmap starting at the offset subfield value and continuing for the length in the length subfield. Further, if there are any trailing '0' values that would be part of the bitmap in the bitmap subfield, they can be omitted from the bitmap subfield and instead assumed to be 0 implicitly. For example, for a sequence 1111000001010101100000000, the "1010101100000000" of the sequence could be represented by a sub-bitmap element having an offset of 10, a reserved value of 1, a length of 1, and a bitmap of "10101011." It should be noted that such an aspect provides the flexibility that an ACK can be sent for only a portion of the packets as opposed to all the packets to be acknowledged by a block ACK.

In another aspect, a block ACK bitmap may be encoded at a block level. For example, a block ACK bitmap may be divided into a number of blocks of equal length (e.g., 1 block for bitmaps that are 8 octets in length (an example of a short bitmap) or 16 blocks for bitmaps that are 128 octets in length (an example of a long bitmap)). Each block may be further divided into sub-blocks (e.g., 1 octet length each). For short bitmaps, each block therefore may include a block bitmap (e.g., 1 octet length) and one or more sub-block bitmaps (e.g., each 1 octet length). The block bitmap may indicate for which sub-blocks of the block a sub-block bitmap is included. For example, the block bitmap may include 8 bits in sequence. The 8 bits in sequence may correspond to a sequence of 8 sub-blocks. If any sub-block has a non-zero value, a sub-block bitmap may be included for that sub-block and the corresponding bit in the block bitmap may have a value of '1.' If the value of all the bits of a sub-block is '0,' the corresponding bit in the block bitmap may have a value of '0' and no sub-block bitmap is included for that sub-block. The sub-block bitmap includes the bit values for a given sub-block. If there is no sub-block bitmap for a given sub-block, the value of all the bits of that sub-block are assumed to be 0. Accordingly, each block is represented by a block bitmap and one or more sub-block bitmaps.

For a long bitmap, each block may be represented by a block offset, a block control, a block bitmap, and one or more sub-block bitmaps. The block offset field (e.g., 4 bits in length) may indicate which block the block control, block bitmap, and one or more sub-block bitmaps have information. The block control may indicate how the block bitmap and one or more sub-block bitmaps should be interpreted. For example, one value of the block control may indicate "normal" bitmap encoding such as the bitmap encoding described above where the block bit map indicates for which sub-blocks of the block a sub-block bitmap is included, and the sub-block bitmap for included sub-blocks includes the bit values for a given sub-block. Another value of the block control may indicate a "single packet" bitmap encoding, where there is a status for only 1 packet in this particular block. Accordingly, the block bitmap is used to indicate the position of the packet and the sub-block bitmap is not present. Another value of the block control may indicate an "inverse" bitmap encoding. The encoding scheme may be the same as the "normal" bitmap encoding, except the resulting bitmap should then be inversed (all '0' to '1' values and vice versa).

Figure 7:
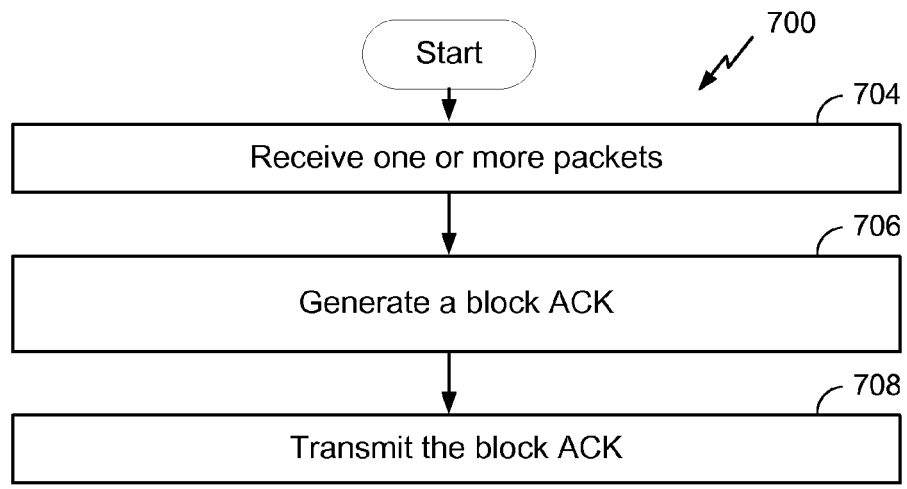
FIG. 7 illustrates an aspect of a method for transmitting a compressed block ACK.

FIG. 7 illustrates an aspect of a method 700 for transmitting a compressed block ACK. The block ACK may be compressed based on the teachings herein. The block ACK may be generated at either the AP 104 or the STA 106 and transmitted to another node in the wireless network 100. Although the method 700 is described below with respect to elements of the wireless device 202r, those having ordinary skill in the art will appreciate that other components may be used to implement one or more of the steps described herein.

At block 704, one or more packets are received. At block 706, a block ACK is generated that is compressed using one or more of the techniques described herein (e.g., compressing the size of block ACKs and/or compressing bitmaps in block ACKs). The generation may be performed by the processor 204 and/or the DSP 220, for example.

Thereafter, at block 708, the block ACK is wirelessly transmitted. The transmission may be performed by the transmitter 210, for example.

Figure 8:
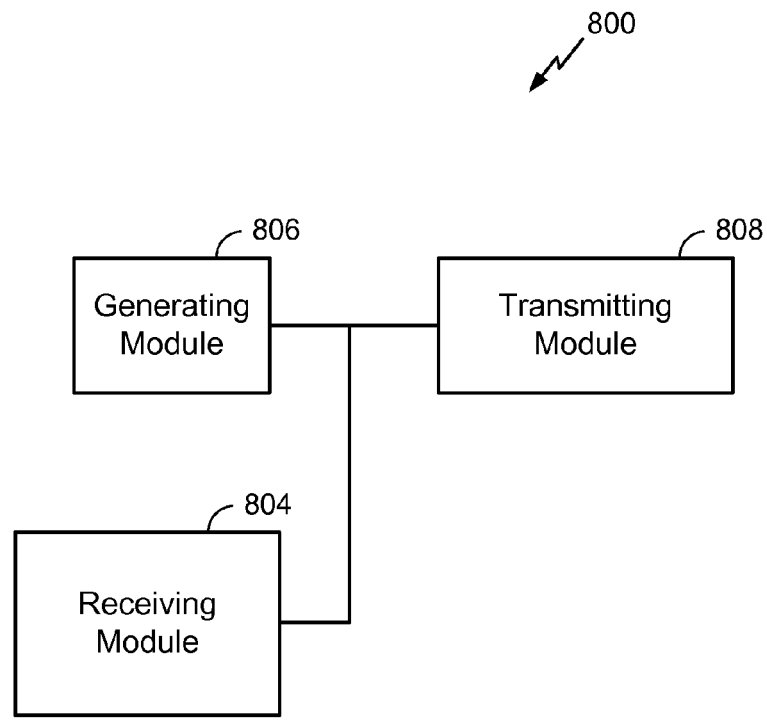
FIG. 8 is a functional block diagram of an exemplary wireless device that may be employed within the wireless communication system of FIG. 1.

FIG. 8 is a functional block diagram of an exemplary wireless device 800 that may be employed within the wireless communication system 100. The device 800 comprises a receiving module 804 for receiving packets. The receiving module 804 may be configured to perform one or more of the functions discussed above with respect to the block 704 illustrated in FIG. 7. The receiving module 804 may correspond to one or more of the processor 204 and the receiver 212. The device 800 further comprises a generating module 806 for generating a block ACK. The generating module 806 may be configured to perform one or more of the functions discussed above with respect to the block 706 illustrated in FIG. 7. The generating module 806 may correspond to one or more of the processor 204 and the DSP 220. The device 800 further comprises a transmitting module 808 for wirelessly transmitting the generated packet. The transmitting module 808 may be configured to perform one or more of the functions discussed above with respect to the block 708 illustrated in FIG. 7. The transmitting module 808 may correspond to the transmitter 210.

Figure 9:
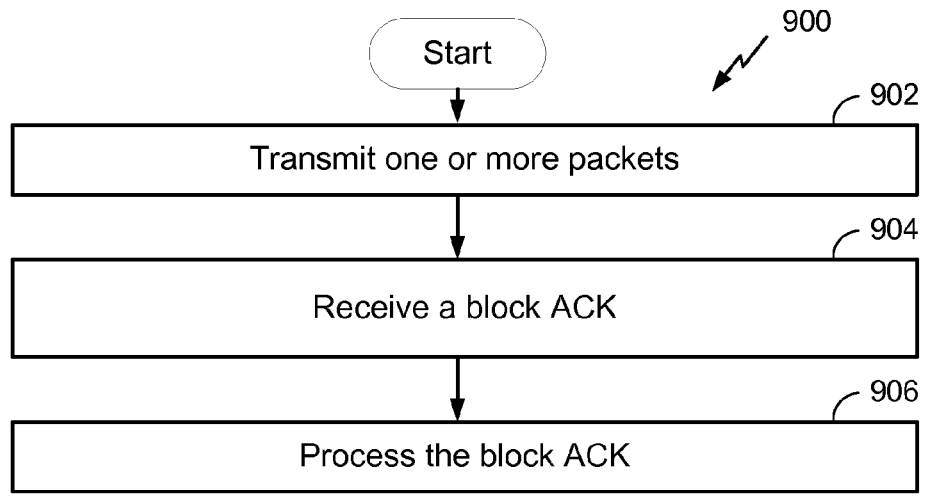
FIG. 9 illustrates an aspect of a method for receiving and processing a block ACK.

FIG. 9 illustrates an aspect of a method 900 for receiving and processing a block ACK. The method 900 may be used to receive and process any type of block ACK described herein. The packet may be received at either the AP 104 or the STA 106 from another node in the wireless network 100. Although the method 900 is described below with respect to elements of the wireless device 202t, those having ordinary skill in the art will appreciate that other components may be used to implement one or more of the steps described herein.

At block 902, a wireless communication one or more packets are transmitted. The transmission may be performed by the transmitter 210, for example.

At a block 904, a block ACK is received based on the transmitted packets. The reception may be performed by the receiver 212, for example.

Further, at a block 906, the wireless device 202t processes the block ACK. The processing may be performed by the processor 204, the signal detector 218, and/or the DSP 220, for example.

Figure 10:
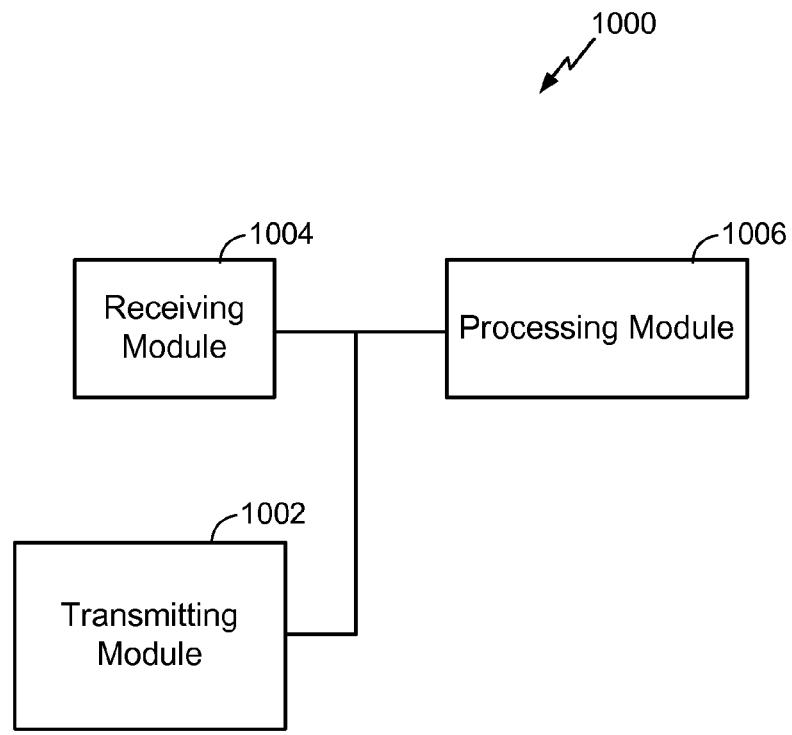
FIG. 10 is a functional block diagram of another exemplary wireless device that may be employed within the wireless communication system of FIG. 1.

FIG. 10 is a functional block diagram of another exemplary wireless device 1000 that may be employed within the wireless communication system 100. The device 1000 comprises a transmitting module 1002 for transmitting one or more packets. The transmitting module 1002 may be configured to perform one or more of the functions discussed above with respect to the block 902 illustrated in FIG. 9. The transmitting module 1002 may correspond to one or more of the processor 204 and the transmitter 210. The device 1000 further comprises a receiving module 1004 for wirelessly receiving a block ACK. The receiving module 1004 may be configured to perform one or more of the functions discussed above with respect to the block 904 illustrated in FIG. 9. The receiving module 1004 may correspond to the receiver 212. The device 1000 further comprises a processing module 1006 for processing the block ACK. The processing module 1006 may be configured to perform one or more of the functions discussed above with respect to the block 906 illustrated in FIG. 9. The processing module 1006 may correspond to one or more of the processor 204, the signal detector 218, and the DSP 220.

Figure 12:
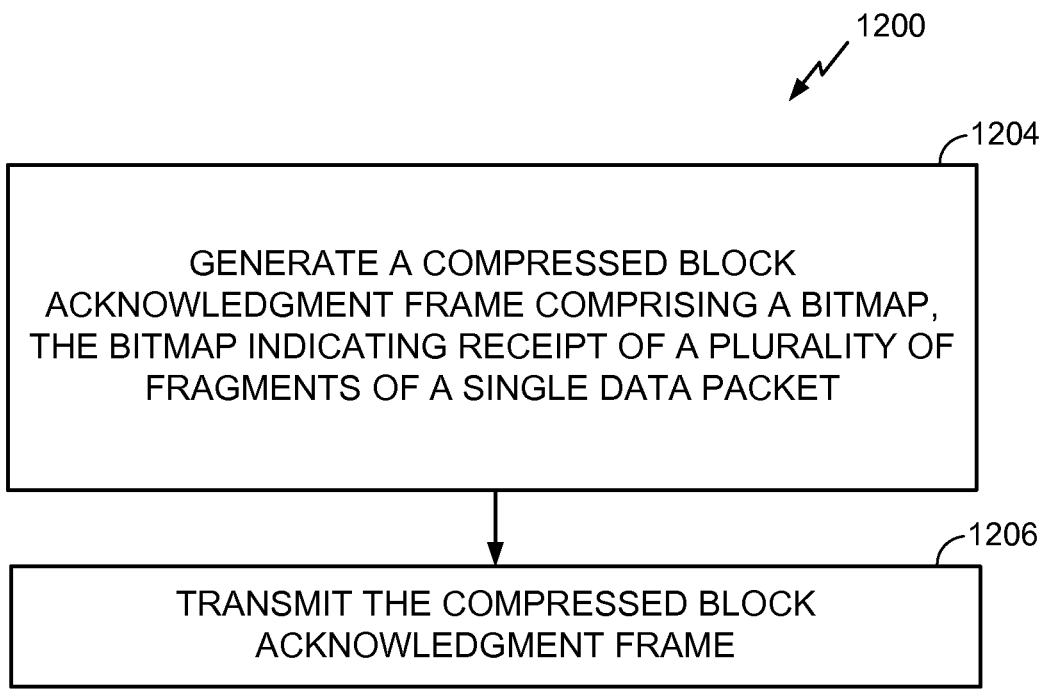
FIG. 12 illustrates an aspect of a method for communicating in a wireless network.

FIG. 12 illustrates an aspect of a method 1200 of communicating in a wireless network. Although the method 1200 is described below with respect to elements of the wireless device 202, those having ordinary skill in the art will appreciate that other components may be used to implement one or more of the steps described herein.

At block 1204, the method includes generating a compressed block acknowledgment frame comprising a bitmap, the bitmap indicating receipt of a plurality of fragments of a single data unit. Accordingly, the compressed block acknowledgement (ACK) may be used to acknowledge fragments of a data unit (e.g., a MSDU). For example, one compressed block ACK may be used to acknowledge up to 16 fragments of a data unit for a 2 MHz communication. In another example, one compressed block ACK may be used to acknowledge up to 8 fragments of a data unit for a 1 MHz communication. In some aspects, generating the compressed block acknowledgment frame comprises including one or more fields of the compressed block acknowledgment frame in a physical layer header. The generating may be performed by the processor 204 and/or the DSP 220, for example. At block 1206, the method includes transmitting the compressed block acknowledgment frame. The transmitting may be performed by the transmitter 210, for example.

In some aspects, the compressed block ACK frame may further comprise an ACK mode field indicating the compressed block ACK frame is of a compressed block ACK frame type. For example, the ACK mode field may be included in the block ACK in order to distinguish between a compressed block ACK that is acknowledging fragments and a compressed block ACK that is acknowledging multiple data units or packets. The ACK mode field may have a first value indicating a block ACK mode (e.g., indicating the block ACK is acknowledging multiple data units or packets) or a second value indicating a fragment mode (e.g., indicating the block ACK is acknowledging fragments).

In some aspects, the compressed block ACK frame may further comprise a starting sequence number of the compressed block ACK. The starting sequence number of the compressed block ACK may be a sequence number of the single data unit (e.g., packet, MSDU, etc.) being fragmented. For example, if the compressed block ACK is acknowledging fragments, the starting sequence number of the compressed block ACK may be the sequence number of the MAC service data unit (MSDU) being fragmented. In some aspects, the starting sequence number of the compressed block ACK may be a group of least significant bits of a sequence number of the single data unit being fragmented. For example, the starting sequence number may be the least significant bits of the sequence number of the MSDU being fragmented.

In some aspects, the compressed block ACK frame may further comprise a block ACK identifier that includes a group of most significant bits of a sequence number of the single data unit being fragmented. For example, the block ACK identifier may be the most significant bits of the starting sequence number of the MSDU being fragmented. In some aspects, the compressed block ACK frame may further comprise a block ACK identifier that is derived from a scrambler seed of a first fragment of the single data unit being fragmented.

Figure 13:
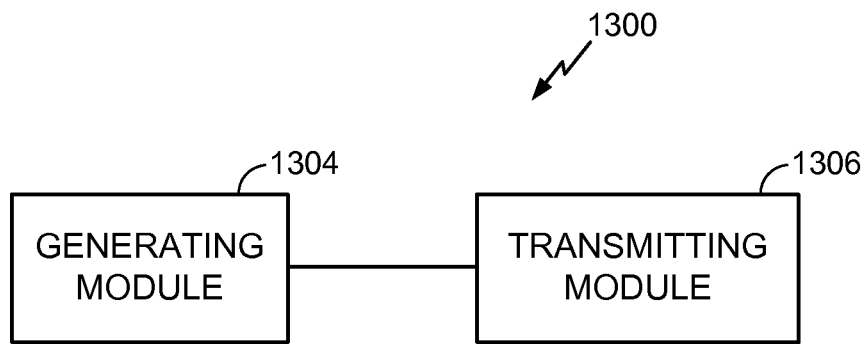
FIG. 13 is a functional block diagram of another exemplary wireless device that may be employed within the wireless communication system of FIG. 1.

FIG. 13 is a functional block diagram of an exemplary wireless device 1300 that may be employed within the wireless communication system 100. The device 1300 comprises a generating module 1304 for generating a compressed block acknowledgment frame comprising a bitmap, the bitmap indicating receipt of a plurality of fragments of a single data unit. The generating module 1304 may be configured to perform one or more of the functions discussed above with respect to the block 1204 illustrated in FIG. 12. The generating module 1304 may correspond to one or more of the processor 204 and the DSP 220. The generating module 1304 may further correspond to a compressor. The device 1300 further comprises a transmitting module 1306 for transmitting the compressed block acknowledgment frame. The transmitting module 1306 may be configured to perform one or more of the functions discussed above with respect to the block 1206 illustrated in FIG. 12. The transmitting module 1306 may correspond to the transmitter 210.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in a wireless network, the method comprising:
    determining that a data frame comprises both an indication that block acknowledgment is requested and a fragment number that is greater than zero;
    generating, based on the determining, a block acknowledgment frame comprising a bitmap, the bitmap indicating receipt of a plurality of fragments of the data frame and a block acknowledgement identifier that is derived from at least a portion of a scrambler seed of the data frame; and
    transmitting the block acknowledgment frame.

2. The method of claim 1, wherein generating the block acknowledgment frame comprises including one or more fields of the block acknowledgment frame in a physical layer header.

3. The method of claim 1, wherein the block acknowledgement frame further comprises an acknowledgement mode field indicating the block acknowledgement frame is of a compressed block acknowledgement frame type.

4. The method of claim 1, wherein the block acknowledgement frame further comprises a starting sequence number of the block acknowledgement.

5. The method of claim 4, wherein the starting sequence number of the block acknowledgement is a sequence number of the data frame.

6. The method of claim 4, wherein the starting sequence number of the block acknowledgement is a group of least significant bits of a sequence number of the data frame.

7. The method of claim 1, wherein the block acknowledgement frame further comprises a block acknowledgement identifier that includes a group of most significant bits of a sequence number of the data frame.

8. The method of claim 1, wherein the block acknowledgement frame further comprises a block acknowledgement identifier that is derived from a scrambler seed of a first fragment of the data frame.

9. The method of claim 1, wherein the block acknowledgement frame further comprises a block acknowledgement identifier that is derived from a first packet of a block for which the block acknowledgment frame is being sent.

10. The method of claim 1, wherein the block acknowledgement frame further comprises a block acknowledgement identifier that is derived from a block acknowledgement request frame.

11. The method of claim 1, wherein the block acknowledgement frame further comprises a block acknowledgement identifier that is derived from a scrambler seed field of a first packet of a block for which the block acknowledgment frame is being sent.

12. The method of claim 1, wherein the block acknowledgement frame further comprises a block acknowledgement identifier that is derived from a scrambler seed of an aggregated packet for which the block acknowledgment frame is being sent.

13. A wireless device, comprising:
a processor configured to:
determine that a data frame comprises both an indication that block acknowledgment is requested and a fragment number that is greater than zero; and
generate, based on the determination, a block acknowledgment frame comprising a bitmap, the bitmap indicating receipt of a plurality of fragments of the data frame and a block acknowledgement identifier that is derived from at least a portion of a scrambler seed of the data frame; and
a transmitter configured to transmit the block acknowledgment frame.

14. The wireless device of claim 13, wherein generating the block acknowledgment frame comprises including one or more fields of the block acknowledgment frame in a physical layer header.

15. The wireless device of claim 13, wherein the block acknowledgement frame further comprises an acknowledgement mode field indicating the block acknowledgement frame is of a compressed block acknowledgement frame type.

16. The wireless device of claim 13, wherein the block acknowledgement frame further comprises a starting sequence number of the block acknowledgement.

17. The wireless device of claim 16, wherein the starting sequence number of the block acknowledgement is a sequence number of the data frame.

18. The wireless device of claim 16, wherein the starting sequence number of the block acknowledgement is a group of least significant bits of a sequence number of the data frame.

19. The wireless device of claim 13, wherein the block acknowledgement frame further comprises a block acknowledgement identifier that includes a group of most significant bits of a sequence number of the data frame.

20. The wireless device of claim 13, wherein the block acknowledgement frame further comprises a block acknowledgement identifier that is derived from a scrambler seed of a first fragment of the data frame.

21. The wireless device of claim 13, wherein the block acknowledgement frame further comprises a block acknowledgement identifier that is derived from a first packet of a block for which the block acknowledgment frame is being sent.

22. The wireless device of claim 13, wherein the block acknowledgement frame further comprises a block acknowledgement identifier that is derived from a block acknowledgement request frame.

23. The wireless device of claim 13, wherein the block acknowledgement frame further comprises a block acknowledgement identifier that is derived from a scrambler seed field of a first packet of a block for which the block acknowledgment frame is being sent.

24. The wireless device of claim 13, wherein the block acknowledgement frame further comprises a block acknowledgement identifier that is derived from a scrambler seed of an aggregated packet for which the block acknowledgment frame is being sent.

25. A wireless device, comprising:
means for determining that a data frame comprises both an indication that block acknowledgment is requested and a fragment number that is greater than zero;
means for generating, based on the determination, a block acknowledgment frame comprising a bitmap, the bitmap indicating receipt of a plurality of fragments of the data frame and a block acknowledgement identifier that is derived from at least a portion of a scrambler seed of the data frame; and
means for transmitting the block acknowledgment frame.

26. The wireless device of claim 25, wherein generating the block acknowledgment frame comprises including one or more fields of the block acknowledgment frame in a physical layer header.

27. The wireless device of claim 25, wherein the block acknowledgement frame further comprises an acknowledgement mode field indicating the block acknowledgement frame is of a compressed block acknowledgement frame type.

28. The wireless device of claim 25, wherein the block acknowledgement frame further comprises a starting sequence number of the block acknowledgement.

29. The wireless device of claim 28, wherein the starting sequence number of the block acknowledgement is a sequence number of the data frame.

30. The wireless device of claim 28, wherein the starting sequence number of the block acknowledgement is a group of least significant bits of a sequence number of the data frame.

31. The wireless device of claim 25, wherein the block acknowledgement frame further comprises a block acknowledgement identifier that includes a group of most significant bits of a sequence number of the data frame.

32. The wireless device of claim 25, wherein the block acknowledgement frame further comprises a block acknowledgement identifier that is derived from a scrambler seed of a first fragment of the data frame.

33. The wireless device of claim 25, wherein the block acknowledgement frame further comprises a block acknowledgement identifier that is derived from a first packet of a block for which the block acknowledgment frame is being sent.

34. The wireless device of claim 25, wherein the block acknowledgement frame further comprises a block acknowledgement identifier that is derived from a block acknowledgement request frame.

35. The wireless device of claim 25, wherein the block acknowledgement frame further comprises a block acknowledgement identifier that is derived from a scrambler seed field of a first packet of a block for which the block acknowledgment frame is being sent.

36. The wireless device of claim 25, wherein the block acknowledgement frame further comprises a block acknowledgement identifier that is derived from a scrambler seed of an aggregated packet for which the block acknowledgment frame is being sent.

37. A non-transitory computer-readable medium comprising code that, when executed, causes an apparatus to:
determine that a data frame comprises both an indication that block acknowledgment is requested and a fragment number that is greater than zero;
generate, based on the determination, a block acknowledgment frame comprising a bitmap, the bitmap indicating receipt of a plurality of fragments of the data frame and a block acknowledgement identifier that is derived from at least a portion of a scrambler seed of the data frame; and
transmit the block acknowledgment frame.

38. The computer-readable medium of claim 37, wherein generating the block acknowledgment frame comprises including one or more fields of the block acknowledgment frame in a physical layer header.

39. The computer-readable medium of claim 37, wherein the block acknowledgement frame further comprises an acknowledgement mode field indicating the block acknowledgement frame is of a compressed block acknowledgement frame type.

40. The computer-readable medium of claim 37, wherein the block acknowledgement frame further comprises a starting sequence number of the compressed block acknowledgement.

41. The computer-readable medium of claim 40, wherein the starting sequence number of the block acknowledgement is a sequence number of the data frame.

42. The computer-readable medium of claim 40, wherein the starting sequence number of the block acknowledgement is a group of least significant bits of a sequence number of the data frame.

43. The computer-readable medium of claim 37, wherein the block acknowledgement frame further comprises a block acknowledgement identifier that includes a group of most significant bits of a sequence number of the data frame.

44. The computer-readable medium of claim 37, wherein the block acknowledgement frame further comprises a block acknowledgement identifier that is derived from a scrambler seed of a first fragment of the data frame.

45. The computer-readable medium of claim 37, wherein the block acknowledgement frame further comprises a block acknowledgement identifier that is derived from a first packet of a block for which the block acknowledgment frame is being sent.

46. The computer-readable medium of claim 37, wherein the block acknowledgement frame further comprises a block acknowledgement identifier that is derived from a block acknowledgement request frame.

47. The computer-readable medium of claim 37, wherein the block acknowledgement frame further comprises a block acknowledgement identifier that is derived from a scrambler seed field of a first packet of a block for which the block acknowledgment frame is being sent.

48. The computer-readable medium of claim 37, wherein the block acknowledgement frame further comprises a block acknowledgement identifier that is derived from a scrambler seed of an aggregated packet for which the block acknowledgment frame is being sent.

* * * * *